United States Patent [19]

Thal

[11] 3,814,102

[45] June 4, 1974

[54] SURGICAL INSTRUMENT

[76] Inventor: Ben Thal, 10602 Friar Tuck Ln., Edmonds, Wash. 98020

[22] Filed: Oct. 12, 1972

[21] Appl. No.: 296,796

[52] U.S. Cl............................ 128/321, 128/325
[51] Int. Cl...................... A61b 17/28, A61b 17/12
[58] Field of Search............ 128/2 R, 318, 321, 305, 128/325 X, 322

[56] References Cited
UNITED STATES PATENTS

| | | | |
|---|---|---|---|
| 2,113,246 | 4/1938 | Wappler | 128/321 |
| 2,790,437 | 4/1957 | Moore | 128/2 |
| 3,585,985 | 6/1971 | Gould | 128/321 |

OTHER PUBLICATIONS

Comprehensive Guide to Purchasing "Gynecological Instruments" Page 450–Item GL 2000 Copy 128/Library RD–76–N18–1956–C2 Scientific Library A.U. 335.

*Primary Examiner*—Aldrich F. Medbery
*Attorney, Agent, or Firm*—Christensen, O'Connor, Garrison & Havelka

[57] ABSTRACT

A surgical instrument commonly referred to as an alligator forceps includes a pair of jaws operably connected to a pair of handles by a longitudinally split shank. The lower jaw is rigidly connected to the lower portion of the split shank. The upper jaw is pivotally connected to the forward ends of both the upper and lower shank portions so that the jaws can be opened and closed by longitudinal movement of the shank portions with respect to each other. A forward handle is rigidly connected to the lower shank portion. A flange, connected to the rear of the upper shank portion, extends downwardly to a point below the lower shank portion. A rearward handle is pivotally connected to the lower shank portion and is connected to the flange at a point below the connection to the lower shank to move the flange forwardly and rearwardly. Thus forward and rearward movement of the rearward handle opens and closes the jaws without longitudinal or angular movement of the jaws with respect to the forward handle.

11 Claims, 6 Drawing Figures

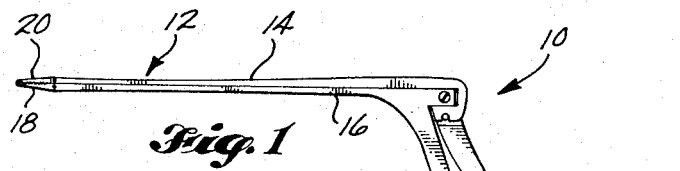
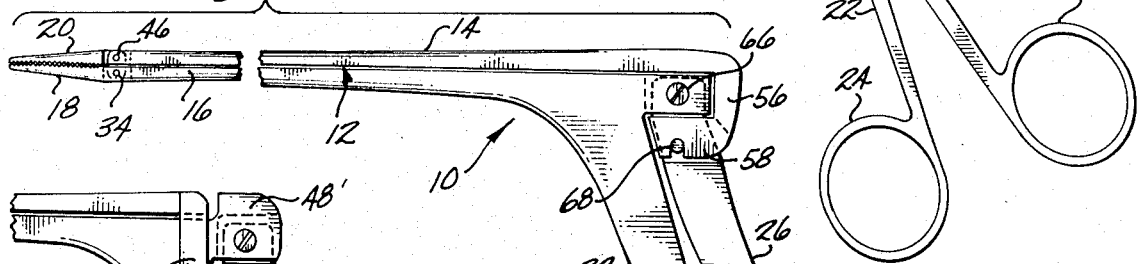
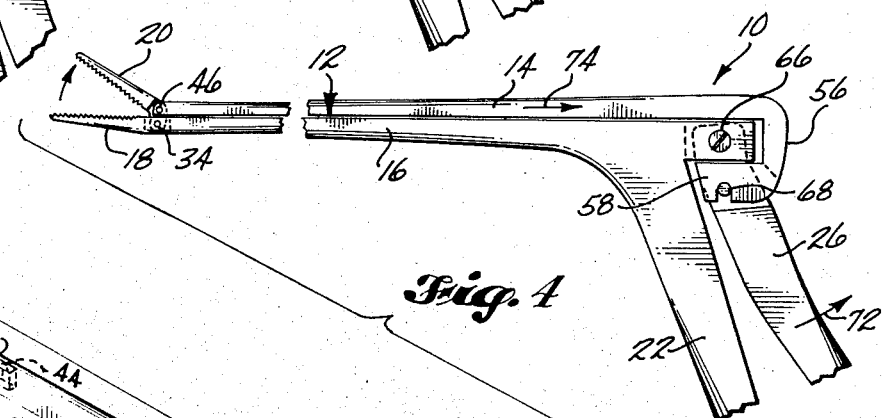
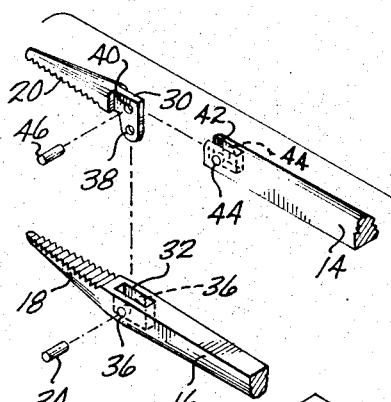
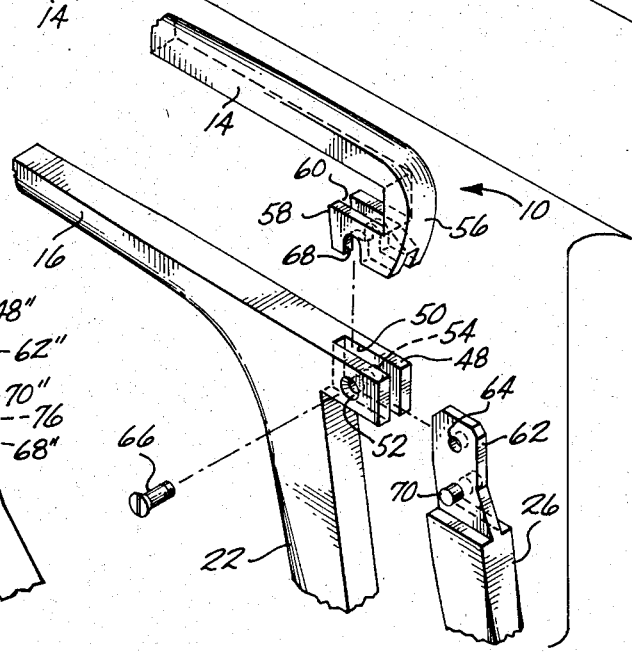

3,814,102

SURGICAL INSTRUMENT

BACKGROUND OF THE INVENTION

This invention relates to surgical instruments of the alligator forceps type and includes similar instruments incorporating variations in the shape and function of the jaws.

Forceps used in otolaryngological surgery and other areas of surgery have traditionally been of one design. This design has a longitudinally divided shank to the forward end of which is connected an opening and closing jaw. Handles are connected to the rearward end of the shank in such manner to close and open the jaws when the handles are translated toward and away from each other. Normally, the forward handle is grasped with the ring finger and steadied with the index and middle fingers while the rearward handle is grasped with the thumb. In normal use, movement of the thumb will open and close the jaws.

In instruments of the prior art as the thumb translates the rearward handle towards and away from the forward handle, which is held in a stationary position by the fingers, the entire shank and attached jaws move angularly downwardly as the jaws are opened and angularly upwardly as the jaws are closed. In use, when the surgeon attempts to close the jaws of the prior art instrument on an object, he must also "chase" the object with the forward end of the shank to succeed in closing the jaws on that object. Difficult surgical maneuvers, such as crimping of the prosthesis during a stapedectomy procedure, are rendered more difficult because of this flaw in the design of prior art alligator forceps.

It is therefore an object of the invention to provide an alligator forceps and related instruments in which the jaws can be opened and closed by thumb manipulation without moving the forward end of the shank or introducing other accompanying motions, such as withdrawal of the jaws as they are closed, and to accomplish this without changing the general configuration of the forceps or the jaw mechanism with which the surgeon is familiar through training and practice. Other objects are to provide an alligator forceps in a full range of sizes from delicate miniature forceps used in ear surgery to heavy bone cutting instruments for orthopedic surgery and to provide a forceps that can accept a full range of jaw shapes and forms to grasp, cut, bite, biopsy, crimp and perform other surgical activities to both soft and hard tissues and materials. A further objective is to provide a forceps of reliable and durable construction which is at least as inexpensive to manufacture as those of the prior art.

SUMMARY OF THE INVENTION

The present invention therefore provides a forceps of the type having a longitudinally divided shank forming a first shank section and a second shank section, the shank having a jaw means mounted at the forward end thereof, the jaw means closing and opening upon longitudinal reciprocating movement of the first and second shank sections relative to each other, the improvement comprising a first handle rigidly connected to the rearward portion of the first shank section, the first handle extending below the shank and having a finger stall thereon, a second handle having a finger stall thereon, said second handle positioned rearwardly of the first handle, a first means connecting the second handle to one of the first handle and the first shank section for movement toward and away from the first handle, a second means connecting the second handle to the second shank section for longitudinally moving the second shank section responsive to movement of the second handle, means connecting said jaw means to said shank sections for closing said jaws responsive to movement of the second handle toward the first handle.

BRIEF DESCRIPTION OF THE DRAWINGS

A better understanding of the present invention can be acquired by reading the ensuing specification in conjunction with the accompanying drawings wherein:

FIG. 1 is an elevation view of the forceps of the present invention;

FIG. 2 is an exploded isometric view of the forceps of the present invention;

FIG. 3 is an enlarged elevation view of the handle and shank connections of the forceps of FIG. 1 partially broken away to show the jaws in a closed position;

FIG. 4 is a view similar to FIG. 2 showing the jaws of the forceps in an open position.

FIG. 5 is an elevation view of an alternate embodiment of the handle and shank connections; and FIG. 6 is an elevation view of another embodiment of the handle and shank connections.

DESCRIPTION OF PREFERRED EMBODIMENTS

FIG. 1 illustrates one embodiment of the forceps of the present invention in an approximation to actual size. The forceps, generally designated 10, has a shank 12 composed of an upper shank section 14 and a lower shank section 16. A lower jaw 18 is rigidly affixed to the forward end of lower shank section 16 while an upper jaw 20 is pivotally mounted to both the lower shank section and the forward end of the upper shank section 14. A first handle 22 is rigidly connected to the lower shank section 16 adjacent its rearward end. A finger stall 24 is provided at the lower end of the forward handle 22. A second handle 26, positioned rearwardly of the first handle 22, is pivotally connected to the rearward end of the lower shank 16 as well as to a rearward portion of the upper shank section 14. The operative relationship of the interconnection of handle 26 will be described in detail later. A finger stall 28 is provided at the lower end of the rearward handle 26.

Referring now to FIG. 2, a detailed isometric of a preferred embodiment of the invention is shown. The lower jaw 18 is integrally connected to the forward end of the lower shank section 16. A downwardly extending flange 30 is integral with the rearward end of the upper jaw 20. A slot 32 is provided in the forward end of lower shank section 16. The flange 30 slidably engages the slot 32. A pin 34 is inserted through the apertures 36 adjacent the forward end of the lower shank 16. The apertures communicate with the slot 32. In addition, the pin engages a mating aperture 38 in the flange 30. Thus the jaw 20 is mounted for pivotal movement toward and away from the lower jaw 18.

A third aperture 30 is provided in the upper end of the flange 30. The upper end of flange 30 mates in sliding relationship with a slot 42 provided in the forward end of the upper shank section 14. Aligned apertures 44 are provided in the forward end of shank section 14 which communicate with the slot 42. A pin 46 is inserted through the apertures 44 and aperture 40 to provide a pivotal connection between the upper shank section 14 and the upper jaw 20.

The rearward end of the lower shank section 16 extends in a rearward direction to form a projection 48. A slot 50 is provided in projection 48. Slot 50 extends in a forward direction from the rearward end of projection 48. A transverse aperture 52 is provided on the left side of projection 48. An aligned aperture 54 is provided on the right side of projection 48. Aperture 54 is internally threaded. The rearward portion of the upper shank section 14 contains a downwardly extending section 56 and a forwardly extending segment 58. A slot 60 extends in a rearward direction from the downwardly extending section 56 through forwardly extending segment 58. The distance between the upper side of segment 58 and the lower side of upper shank section 14 corresponds to the height of the projection 48. Thus, the rearward portion of the shank section 14 extends over, behind and under the projection 48.

A forward handle 22 is rigidly connected with the bottom portion of lower shank section 16. Handle 22 extends downwardly from shank section 16 and preferably angles from top to bottom in a rearward direction. A second handle 26 has a flange 62 extending upwardly from its upper end. When the rearward portion of upper shank section 14 is positioned over the projection 48, the flange 62 can be inserted upwardly through slots 50 and 60 until the aperture 64 in flange 62 aligns with the apertures 52 and 54. Therafter a bolt 66 is inserted through the apertures. The bolt 66 contains an externally threaded portion which screwably engages with the internally threaded aperture 54.

The forwardly extending segment 58 on the rearward portion of upper shank section 14 contains a pair of upwardly extending slots 68 which mate with a transverse pin 70 connected to flange 62 below aperture 64. Thus when the rearward handle 26 is translated toward handle 22 by pivoting about the bolt 66, pin 70 will move in a forward direction. Since it engages the slots 68 in segment 58, the entire upper shank section 14 will be moved in a longitudinally forward direction with respect to the lower shank section 16. A double acting cam mechanism is formed by pin 70 and slots 68 since movement of pin 70 in either a forward or rearward direction will bear against either the forward or rearward edges of slots 68, thus causing movement of segment 68.

As seen in FIG. 2, the upper and lower jaws 20 and 18, respectively, are shown in a closed position. In this position, the rearward handle 26 is in its forwardmost position. In this position the pin 70 forces the upper shank section 14 in a forward direction, thus closing the jaw 20 upon the jaw 18. When the handle 26 is manipulated in a rearward direction, as shown by arrow 72, pin 70 bears against slot 68 in segment 58 to move the entire upper shank section 14 in a rearward direction as indicated by arrow 74. As the shank section 14 moves in a rearward direction, pin 46 pulls in a rearward direction on the upper portion of the flange 30 of jaw 20, causing jaw 20 to rotate about the pivot axis provided by pin 34 in the lower shank section 16. Thus the jaws 18 and 20 are opened.

In use, the ring finger is inserted through the finger stall 24 in forward handle 22. The index finger and middle finger of the same hand are rested against the forward side of the forward handle 22. The thumb of the same hand is then inserted through the finger stall 28 of rearward handle 26. Normal manipulation of the instrument dictates that the fingers provide the steadying platform for use of the instrument. Thus opening and closing of jaws 20 and 18 is provided by movement of the thumb in the finger stall 28 in a rearward and forward direction, respectively. When the instrument is manipulated, as in surgery, with the forward handle 22 held rigidly by the fingers of one hand and the rearward handle 26 manipulated by the thumb of the same hand, a significant advantage is present, i.e., the jaws 18 and 20 can be opened or closed without a corresponding downward or upward movement of the forward end of the shank 12. The stability of the instrument is provided by the fact that it rests against the ring, middle and index fingers while the thumb actuates the jaw 20. Thus very precise positioning and manipulation of the forceps, as in ear surgery, can be more easily accomplished without the necessity of moving the wrist or arm awkwardly to compensate for the accompanied shank motion of prior art instruments. An additional advantage is that the jaws do not withdraw or move longitudinally as they are closed as occurs in other prior art forceps. Further, the instrument meets the objectives of providing a conventional alligator forceps configuration and conventional jaw action with which the surgeon is familiar. Still further, the instrument is of relatively simple construction and is at least as inexpensive to manufacture as instruments of the prior art.

Several aspects of the design of this instrument are important in the overall improvement of the stability and function of the instrument with the retention of familiar appearance and jaw action. Firstly, the rigid one piece construction of the lower jaw 18, lower shank section 16 and forward handle 22. By this rigid arrangement the stability of the finger platform is directly and rigidly transmitted from the hand to the lower jaw. Secondly, to retain conventional jaw mechanism and subsequent jaw action requires that jaw closure be accompanied by forward motion of the upper shank section 14 upon the lower shank section 16, as the rearward handle 26 is moved by the thumb towards the forward handle 22. In the preferred embodiment, described above, this is accomplished by transmitting movement of the rearward handle 26 to the upper shank section 14 through movement of pin 70 and subsequent movement of sections 58 and 56 of the upper shank section 14.

The present invention has been described above in relation to the preferred embodiment. Various alterations, substitutions of equivalents and other changes can be made by those of ordinary skill in the art after reading the present specification. In the preferred embodiment the interconnecting section 56 is situated proximal to projection 48. For example, the connection between segment 58 and the upper shank section 14 can also be accomplished by a single interconnecting section 56' lateral to projection 48' as shown in FIG. 5; or a segment 56' located on each side of projection 48'. Another alternative, shown in FIG. 6, is to pass an interconnecting segment 56'' through an enlarged slot 50'' in projection 48''. Enlarged slot 50'' extends forwardly to allow the interposed segment 56'' to slide rearwardly and forwardly within the slot. The flange 62'' is modified so that it can engage pin 70'' and accommodate the interconnecting segment 56'' in a slot 68″. Pin 70″ mates with appropriate apertures in flange 62″ to engage slot 68″.

Any of a variety of jaws can be utilized with the present instrument including scissor jaws, biopsy jaws, crimping jaws and many others as well as the grasping jaws shown in the drawings. The instrument may have a long shank for use in procedures as bronchoscopy and laryngoscopy and may be of very heavy construction for use in bone surgery or other heavy work. It can also be of a very delicate form for use in microsurgery in all surgical specialities. It is therefore intended that the present invention be limited only by the definition contained in the appended claims.

What is claimed is:

1. In a forceps of the type having a longitudinally divided shank forming a first shank section and a second shank section, said shank having a jaw means mounted at the forward end thereof, said jaw means closing and opening upon longitudinal translational movement of said first and second shank sections relative to each other, the improvement comprising:
   a first handle rigidly connected to the rearward portion of said first shank section, said first handle extending below said shank and having a finger stall thereon,
   a projection rigidly connected to and extending rearwardly from said first shank section,
   a second handle having a finger stall thereon, said second handle positioned rearwardly of said first handle,
   first means connecting said second handle to said projection for movement toward and away from said first handle,
   flange means connected to the rearward end of said second shank section, said flange means having a first segment extending downwardly from the rearward end of said second shank section at a location rearwardly of said projection on said first shank section and a second segment connected to said first segment, said second segment projecting in a forward direction under said projection on said first shank section and toward said first handle,
   second means connecting said second handle to said second segment of said flange means for longitudinally moving said second shank section responsive to movement of said second handle, and
   means connecting said jaw means to said shank sections for closing said jaws responsive to movement of said second handle toward said first handle.

2. The forceps of claim 1 wherein said first means pivotally connects said second handle to one of said first handle and first shank section.

3. The forceps of claim 2 wherein said first means pivotally connects said second handle to the rearward portion of said first shank section.

4. The forceps of claim 3 wherein said second means is a cam means.

5. The forceps of claim 1, said first shank section comprising the lower portion of said shank, said second shank section comprising the upper portion of said shank.

6. The forceps of claim 1, said proximal projection having a channel means therein slidably engaging the upper end of said second handle, said second segment having a channel means for slidably engaging the portion of said second handle adjacent said upper end thereof, said first means comprising a pivot pin positioned transversely through aligned apertures in said rearward projection and said upper end of said second handle.

7. The forceps of claim 6, said cam means comprising a pin secured in a transverse position to the portion of said second handle adjacent said upper end, said pin mating with a cam surface in said second segment.

8. In a forceps of the type having a longitudinally divided shank forming a first shank section and a second shank section, said shank having a jaw means mounted at the forward end thereof, said jaw means closing and opening upon longitudinal translational movement of said first and second shank sections relative to each other, the improvement comprising:
   a first handle rigidly connected to the rearward portion of said first shank section, said first handle extending below said shank and having a finger stall thereon,
   a projection rigidly connected to and extending rearwardly from said first shank section,
   a second handle having a finger stall thereon, said second handle positioned rearwardly of said first handle,
   first means connecting said second handle to said projection for movement toward and away from said first handle,
   flange means connected to the rearward end of said second shank section, said flange means having a segment extending downwardly beside said first shank section and a portion located rearwardly of said first handle,
   second means connecting said second handle to said portion of said flange means for longitudinally moving said second shank section responsive to movement of said second handle, and
   means connecting said jaw means to said shank sections for closing said jaws responsive to movement of said second handle toward said first handle.

9. In a forceps of the type having a longitudinally divided shank forming a first shank section and a second shank section, said shank having a jaw means mounted at the forward end thereof, said jaw means closing and opening upon longitudinal translational movement of said first and second shank sections relative to each other, the improvement comprising:
   a first handle rigidly connected to the rearward portion of said first shank section, said first handle extending below said shank and having a finger stall thereon,
   a projection rigidly connected to and extending rearwardly from said first shank section,
   a second handle having a finger stall thereon, said second handle positioned rearwardly of said first handle,
   first means connecting said second handle to said projection for movement toward and away from said first handle, said first shank section having a forwardly extending slot positioned forwardly of said first means,
   flange means connected to the rearward end of said second shank section, said flange means having a portion extending downwardly and rearwardly through said forwardly extending slot to a position below said first means,
   second means connecting said second handle to said portion of said flange means below said first means for longitudinally moving said second shank section responsive to movement of said second handle, and means connecting said jaw means to said shank sections for closing said jaws responsive to movement of said second handle toward said first handle.

10. In a forceps of the type having a longitudinally divided shank forming a first shank section and a second shank section, said shank having a jaw means mounted at the forward end thereof, said jaw means closing upon forward longitudinal translational movement of said second shank section relative to said first shank section and opening upon rearward longitudinal translational movement of said second shank section relative to said first shank section, the improvement comprising:

a first handle rigidly connected to the rearward portion of said first shank section to form a rigid handle and shank unit, said first handle extending below said shank and having a finger stall thereon, a second handle having an upper portion and a lower portion and having a finger stall on the lower portion thereof, said second handle positioned rearwardly of said first handle, first pivot means pivotally connecting the upper portion of said second handle to said rigid handle and shank unit for swinging movement toward and away from said first handle, a downwardly extending flange means fixed to the rearward portion of said second shank section, said downwardly extending flange means having a portion thereof positioned below the location of said first pivot means, and second means movably connecting said second handle to said portion of said downwardly extending flange means for moving said second shank section longitudinally forwardly responsive to forward swinging movement of said second handle about said first pivot means.

11. The forceps of claim 10 wherein said second means is a cam means.

* * * * *